(12) United States Patent
Dutton et al.

(10) Patent No.: US 6,447,899 B1
(45) Date of Patent: Sep. 10, 2002

(54) HEATSEALABLE MULTI-LAYER POLYMER FILMS

(75) Inventors: Richard Neill Dutton, Wigton; Claire Elizabeth Thorpe, Stockton-on-Tees, both of (GB)

(73) Assignee: UCB, S.A., Brussels (BE)

( * ) Notice: Subject to any disclaimer, the term of this patent is extended or adjusted under 35 U.S.C. 154(b) by 0 days.

(21) Appl. No.: 09/623,003
(22) PCT Filed: Feb. 24, 1999
(86) PCT No.: PCT/EP99/01182
§ 371 (c)(1), (2), (4) Date: Mar. 26, 2001
(87) PCT Pub. No.: WO99/43494
PCT Pub. Date: Sep. 2, 1999

(30) Foreign Application Priority Data

Feb. 25, 1998 (GB) .............................................. 9803848

(51) Int. Cl.⁷ ................................................ B32B 27/30
(52) U.S. Cl. ................................ 428/349; 428/355 AC; 428/520; 428/522
(58) Field of Search ................................ 428/520, 522, 428/349, 355 AC

(56) References Cited

U.S. PATENT DOCUMENTS

| | | | |
|---|---|---|---|
| 3,297,477 A | 1/1967 | Barkis et al. ............... | 428/323 |
| 5,266,406 A | 11/1993 | Hartog et al. ............. | 428/423.1 |
| 5,308,890 A | 5/1994 | Snyder ........................ | 523/201 |
| 5,349,025 A * | 9/1994 | Siol et al. .................... | 525/309 |

FOREIGN PATENT DOCUMENTS

| | | | |
|---|---|---|---|
| DE | 19633181 A1 | * | 8/1998 |
| EP | 0 254 417 | | 1/1988 |
| EP | 0 825 238 | | 2/1998 |
| JP | 4-912812 | * | 5/1997 |
| WO | 94 25270 | | 11/1994 |
| WO | WO 96/37569 | * | 11/1996 |

* cited by examiner

Primary Examiner—D. Lawrence
(74) Attorney, Agent, or Firm—Wenderoth, Lind & Ponack, L.L.P.

(57) ABSTRACT

A multi-layer film including: (a) a substrate layer of a thermoplastic polymer film having opposed first and second surfaces; and (b) a heat sealable layer associated with the first surface of the substrate and including (i) a first acrylic polymer and (ii) a second polymer which is a copolymer including residues derived from one or more olefinically unsaturated monomers and residues derived from one or more olefinically unsaturated monomers which include one or more functional groups. The first polymer (i) has a glass transition temperature in the range of from 40 to 120° C. and a weight average molecular weight in the range of from 20,000 to 60,000, the second polymer (ii) is a copolymer of a $C_1$–$C_4$ olefinically unsaturated hydrocarbon and an olefinically unsaturated carboxylic acid, and the heat-sealable layer includes from 5 to 60% by weight of the first acrylic polymer and from 40 to 95% by weight of the second polymer.

33 Claims, 1 Drawing Sheet

HEATSEALABLE MULTI-LAYER POLYMER FILMS

This is a 371 application of PCT/EP99/01182 filed Feb. 24, 1999.

BACKGROUND OF THE INVENTION

1. Field of the Invention

This invention relates to polymer films and more particularly to multi-layer polymer films. The invention relates, in particular, to a multi-layer polymer film having a substrate layer of an oriented polyolefin film such as an oriented polypropylene film.

2. Description of Related Art

The packaging industry requires large quantities of heat-sealable film which can be sealed to itself at a temperature which will not impair the film integrity. Polyolefins are in demand as film forming materials owing to their strength and clarity but, in general, exhibit relatively poor heat sealing characteristics. This is especially true of polypropylene film.

Attempts to improve the heat sealing characteristics have generally involved the application of a heat sealable layer to one surface of a polyolefin film base. The heat sealable layer is composed of a material which can be melted or partially melted at a temperature below that at which the polyolefin begins to soften. To be effective, the heat sealable layer must be composed of a material which allows for sealing over a relatively wide temperature range and which adheres securely to the polyolefin film base. Furthermore, the heat sealable layer must be able to provide a bond of adequate strength when it bonds to itself. This latter characteristic is usually termed the heat seal strength.

Heat sealable layers or coatings comprising a copolymer of ethylene and an unsaturated carboxylic acid, vinyl acetate or vinyl alcohol are well known in the packaging industry. One layer which has found particular favour comprises a copolymer of ethylene and acrylic acid. These materials have certain advantages and, in particular, can be sealed at relatively low temperatures to provide a water resistant seal which is resistant to crazing when flexed. However, the nature of conventionally used heat sealable materials is generally such that the resulting film tends to exhibit the phenomenon of "blocking" in which unwanted adhesion occurs between two layers of film which are placed in contact under moderate pressure as may occur during processing, use or storage of the film. Films exhibiting this problem do not perform well on film handling equipment and attempts to peel apart adjacent layers of blocked film may severely damage the film surface. As a result, heat sealable layers tend to be applied at the time of use to avoid the problem of blocking.

The susceptibility of a film to blocking may be reduced by incorporating a particulate additive, such as silica and/or alumina having a mean particle size of up to about 20 μm, into the heat sealable layer. However, the incorporation of such particulates into the heat sealable layer will often detract from other desirable film characteristics, such as optical clarity, colour and printability. Moreover, the presence of particulate additives may generate an unacceptable accumulation of abrasive debris on, and around, the film, handling equipment. In general, measures adopted to inhibit blocking usually adversely affect the heat sealing characteristics of the film, particularly the sealing range and threshold temperature.

WO-94/25270 describes a base polymer film coated with a heat sealable layer comprising a copolymer of 65 to 95 weight % ethylene and 5 to 35 weight % (meth)acrylic acid in which 2 to 80% of the carboxylate groups are neutralized with metal ions from Groups Ia, IIa, or IIb of the Periodic Table. The resulting film is said to have improved hot tack and blocking properties without an unacceptable sacrifice of low minimum seal temperature. In particular Table II reports minimum seal temperatures (to reach 100 g/25 mm seal strength) of above 89° C. The seal which formed is also claimed to be resistant to water immersion. Nevertheless, the presence of the metal ions, which are non-volatile and thus remain in the layer, tends to confer undesirable moisture sensitivity which can result in blocking of the film in moist or humid environments or the loss of seal strength when packing moist products. In addition, the hot tack performance of the seal, i.e. the strength of the seal when heated to a temperature at or above the melting point of the polymer forming the seal, tends to be unsatisfactory.

EP-A-229,910 discloses a heat-sealable polyolefin film coated on either one or both sides with a composition comprising 40 to 70% by weight of an acrylic polymer, 15 to 30% by weight of an alkyl(meth)acrylate/styrene/unsaturated carboxylic acid copolymer and 15 to 30% by weight of a vinyl ester/unsaturated amide copolymer. The sealing temperature reported in Table I is 130° C.

SUMMARY OF THE INVENTION

Therefore the goal of this invention is to achieve a multi-layer film having a heat-sealable layer avoiding the various problems—blocking phenomenon, moisture sensitivity, insufficient tack performance of the seal—of the prior art and having a low heat-sealing temperature.

We have now developed a multi-layer film having a heat sealable layer which can ameliorate or substantially eliminate one or more of the aforementioned problem According to the present invention there is provided a multi-layer film comprising:
  a.) a substrate layer of a thermoplastic polymer film having opposed first and second surfaces; and
  b.) a heat sealable layer associated with the first surface of the substrate and comprising
   (i) a first acrylic polymer and
   (ii) a second polymer which is a copolymer comprising residues derived from one or more olefinically unsaturated monomers and residues derived from one or more olefinically unsaturated monomers which comprise one or more functional groups,
  characterized in that the first polymer (i) is an amorphous polymer having a glass transition temperature in the range of from 40 to 120° C. and a weight average molecular weight (Mw) in the range of from 20,000 to 60,000, the second polymer (ii) is a copolymer of a $C_2$–$C_4$ olefinically unsaturated hydrocarbon and an olefinically unsaturated carboxylic acid, and the heat-sealable layer comprises from 5 to 60% by weight of the first acrylic polymer and from 40 to 95% by weight of the second polymer.

The multi-layer film is a self-supporting structure in the sense that it is capable of independent existence in the absence of a supporting base. The heat sealable layer is generally coextensive with the substrate layer.

The present invention also provides packaging material comprising the multi layer film defined above.

The heat sealable layer of the multi-layer film of the present invention will preferably have a heat sealing temperature in the range of from 50 to 90° C., more preferably in the range of from 60 to 80° C.

DETAILED DESCRIPTION OF THE PREFERRED EMBODIMENTS

Figure 1:
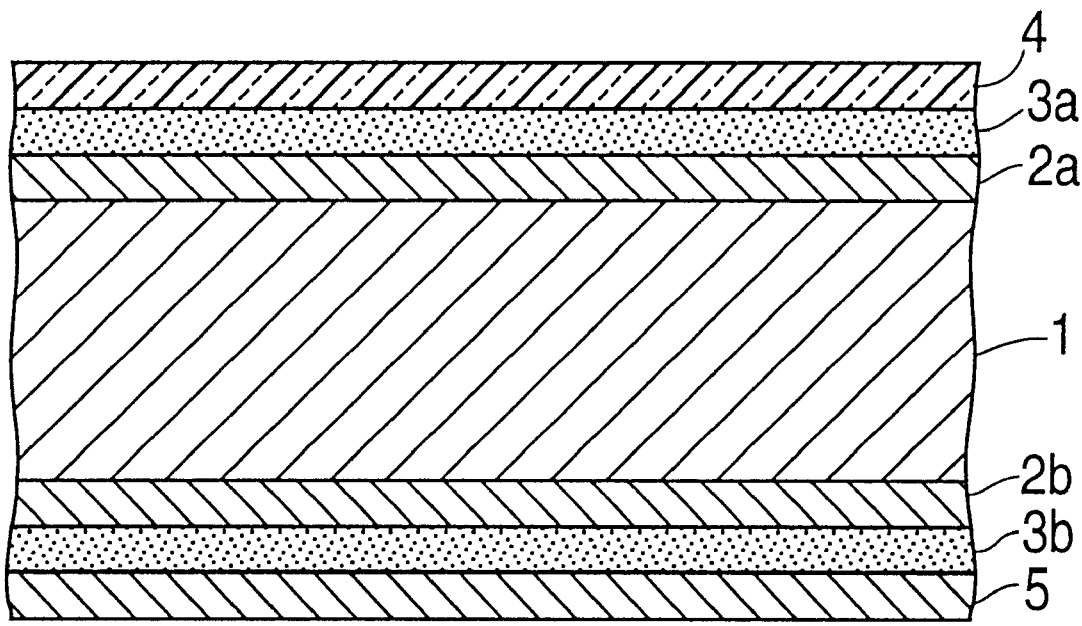
FIG. 1 is a schematic view (not to scale) of a preferred multilayer film of the invention.

The first polymer (i) preferably is a copolymer of at least one alkyl acrylate, at least one alkyl methacrylate (pref. $C_1$–$C_8$) and up to 20% by weight of at least one unsaturated carboxylic acid such as acrylic, methacrylic, maleic and crotonic acid.

The first polymer is an amorphous material having a glass transition temperature (Tg) in the range of from 40 to 120° C., preferably in the range of from 50 to 100° C., more preferably in the range of from 50 to 80° C. and particularly in the range of from 50 to 70° C.

The weight average molecular weight (Mw) of the first amorphous polymer is preferably in the range of from 20,000 to 60,000, particularly in the range of from 35,000 to 40,000. In another embodiment, the first polymer is suitably a homopolymer or copolymer of at least one acrylic monomer selected from the $C_{1-8}$alkyl ($C_{1-4}$alkyl)acrylates, the $C_{1-4}$alkyl (meth)acrylates and optionally at least one acrylic monomer selected from acrylic acid and methacrylic acid. Suitable $C_{1-4}$alkyl (meth)acrylates include methyl methacrylate, methyl acrylate, ethyl acrylate, propyl acrylate and butyl acrylate.

In a most preferred embodiment, the first acrylic polymer is a copolymer of a $C_{1-4}$alkyl methacrylate, especially methyl methacrylate, a $C_{1-4}$ alkyl acrylate, especially ethyl acrylate, and acrylic and/or methacrylic acid, especially methacrylic acid. In this preferred embodiment, the copolymer preferably comprises from 40 to 80 weight %, particularly from 50 to 70 weight %, of monomer residues derived from the $C_{1-4}$ alkyl methacrylate, from 15 to 55 weight %, particularly from 25 to 45 weight %, of monomer residues derived from the $C_{1-4}$alkyl acrylate, and from 2 to 6 weight %, particularly from 3 to 5 weight %, of monomer residues derived from the (meth)acrylic acid, all percentages being based on the total weight of the copolymer. The (meth) acrylic acid monomer residues in the acrylic polymer of this preferred embodiment facilitate the dissolution of the polymer in water since the carboxylic acid groups can be neutralised with an ammonium salt to form ammonium carboxylate groups.

The second polymer will preferably have a number average molecular weight (Mn) in the range of from 2,000 to 100,000, more preferably in the range of from 5,000 to 15,000 and particularly in the range of from 7,000 to 12,000. The crystalline melting point (Tm) of the second polymer is typically in the range of from 60 to 100° C., preferably in the range of from 70 to 90° C., and particularly in the range of from 75 to 85° C. The glass transition temperature (Tg) of the second polymer is typically in the range of from 0 to −60° C., preferably in the range of from 0 to −40° C., and particularly in the range of from −10 to −30° C.

The molecular weight of the first polymer is generally higher than that of the second.

The functional groups in the second polymer facilitate the dissolution of the copolymer in an aqueous medium since they can be neutralised with an ammonium salt to form ammonium carboxylate groups. Preferred olefinically unsaturated carboxylic acids are acrylic acid and methacrylic acid, especially acrylic acid. In a preferred embodiment, the second polymer preferably comprises from 60 to 95 weight %, particularly from 70 to 90 weight % and especially from 80 to 90 weight % of monomer residues derived from the $C_{2-4}$ olefinically unsaturated hydrocarbon and from 5 to 40 weight %, particularly from 10 to 30 weight % and especially from 10 to 20 weight % of monomer residues derived from the olefinically unsaturated carboxylic acid, all percentages being based on the total weight of the copolymer. In order to achieve the goal of the invention, the heat sealable layer will preferably comprise from 10 to 50 weight % of the first polymer and from 40 to 90 weight % of the second polymer based on the total weight of the constituents making up the layer.

Either or both of the first and second polymers forming the heat sealable layer may be cross-linked and they may be cross-linked to each other. Crosslinking may be effected by the addition of a suitable amount of at least one reactive compound which is able to react with free carboxylic acid groups which are present either in the first acrylic amorphous polymer or in the second polymer of in both of them. Examples of such reactive compounds are isocyanates, melamine-formaldehyde, urea-formaldehyde and phenol-formaldehyde condensates, divalent and trivalent metal ions and the like. The amount of such a reactive compound will be selected, as is known to those skilled in the art, depending on the amount of carboxylic acid groups in the first and/or second polymer.

In addition to the essential polymers described above, the heat sealable layer of this invention may also contain a slip agent such as a particulate, microcrystalline wax. When used, the wax is typically present in the layer in an amount of from 0.5 to 5.0 weight %, preferably in an amount of from 1.5 to 2.5 weight %, based on the total weight of the constituents forming the layer. The wax particles typically have a mean particle size in the range of from 0.1 to 0.6 μm, preferably in the range of from 0.1 to 0.3 μm. In addition to functioning as a slip agent, the microcrystalline wax may also act as an anti-blocking aid.

If desired, blocking resistance of the heat sealable layer can be increased by incorporation into the layer of a conventional inert particulate additive, preferably one having a mean particle size in the range of from 0.25 to 4.5 μm and particularly preferably of from 0.75 to 3.0 μm. Decreasing the particle size improves the gloss of the film. When used, the inert particulate additive, which is preferably spherical, generally comprises from 0.1 to 5 weight % of the total weight of the constituents forming the layer.

An inert particulate additive for inclusion in the heat sealable layer may comprise an inorganic or an organic additive, or a mixture of two or more such additives.

Suitable particulate inorganic additives include inorganic fillers, and particularly metal or metalloid oxides, such as alumina and silica. Solid or hollow, glass or ceramic microbeads or micro-spheres may also be employed.

A suitable organic additive comprises particles, preferably spherical, of an acrylic resin comprising a polymer or copolymer of acrylic acid and/or methacrylic acid and/or a lower alkyl (up to 8 carbon atoms) ester thereof. Such resins may be cross-linked, for example by the inclusion therein of a cross-linking agent, such as a methylated melamine-formaldehyde resin. Promotion of cross-linking may be assisted by the provision of appropriate functional groupings, such as hydroxy, carboxy and amido groupings, in the acrylic and/or methacrylic polymer.

The thermoplastic polymer film forming the substrate layer is preferably a polyolefin polymer film and more particularly is a molecularly oriented polyolefin polymer film. By a polyolefin polymer film we mean a film which is substantially composed, e.g. from 90 to 100% by weight on the total weight of the film, of at least one polyolefin polymer.

The polyolefin polymer film preferably comprises and may consist essentially of a propylene polymer layer comprising a polypropylene homopolymer or a propylene-olefin copolymer. Preferably, the polyolefin film comprises a layer which is substantially composed, e.g. from 90 to 100% by weight on the total weight of the layer, of a polypropylene homopolymer or a propylene-olefin block copolymer containing up to 15% by weight, on the total weight of the copolymer, of monomer residues derived from at least one other copolymerisable olefin, such as ethylene. The number average molecular weight (Mn) of the propylene polymer forming the layer is typically in the range of from 20,000 to 200,000, preferably in the range of from 30,000 to 100,000 and particularly in the range of from 40,000 to 80,000. In a preferred embodiment, the propylene polymer layer comprises an isotactic polypropylene homopolymer and more particularly comprises from 90 to 99% by weight, of an isotactic polypropylene homopolymer and from 1 to 10% by weight, of a polydicyclopentadiene resin or some other resin able to increase some or all of the desirable properties of a film such as clarity, gloss and barrier performance.

Of particular interest as a substrate layer are polymeric films which themselves comprise a composite, multi-layer structure. For example, a preferred substrate layer is a multi-layer polymer film including a central or core layer comprising a propylene polymer, which is preferably a polypropylene homopolymer or a propylene-olefin copolymer as described above, and first and second outer layers formed on opposed surfaces of the core layer comprising an olefin polymer which has better adhesion to the subsequently applied layers than the polymer of the core layer.

Suitable outer layers comprise and preferably consist essentially of an essentially olefinic polymer, such as an ethylene-propylene block copolymer, an ethylene-mono alpha olefin random copolymer containing from 1 to 15% by weight on the weight of the copolymer of mono alpha olefin monomer residues which contain from 3 to 10 carbon atoms, or a blend of such polymers. A preferred material for the outer layer is a linear low density ethylene polymer, e.g. a linear polymer of ethylene and optionally a higher olefin comprising from 90% to 100% by weight of ethylene monomer residues on the total weight of the polymer, having a density in the range of from 0.91 to 0.94 g/cc.

A particularly preferred core layer for the multi-layer substrate film described above, is one comprising an isotactic polypropylene homopolymer and more particularly one comprising from 90 to 99% by weight, of an isotactic polypropylene homopolymer and from 1 to 10% by weight, of a polydicyclopentadiene resin based on the total weight of the core layer.

When the substrate layer is a three layer film as described above, the core layer will preferably constitute from 70 to 98% of the total thickness of the film with the two outer layers constituting the remainder and typically being of substantially equal thicknesses.

Other suitable polymer films for the substrate layer may be composed of non-hydrocarbon polymers, e.g. polyesters such as polyethylene terephthalate (PET) and polyamides (nylons). A polyolefin polymer film for the substrate layer may be fabricated using any of the techniques known in the art for the production of films, but is most conveniently prepared using an extrusion process.

Formation of a multi-layer film for the substrate layer may be effected by any of the laminating or coating techniques employed in the films art. Preferably, however, the outer layers are applied to the base or core layer by a coextrusion technique in which the polymeric components of the core and outer layers are coextruded into intimate contact while each is still molten. Preferably, the coextrusion is effected from a multi-channel annular die such that the molten polymeric components constituting the respective, individual layers of the composite substrate merge at their boundaries within the die to form a single composite structure which is then extruded from a common die orifice in the form of a tubular extrudate. The substrate film of the invention is preferably oriented by stretching at a temperature above the glass transition temperature of the polymer(s). For example, orientation of a substrate film having a propylene polymer layer (whether on its own or as part of a multi-layer structure) is conveniently effected at a temperature in a range of from about 145 to 155° C.

Orientation may be effected uniaxially, by stretching the film in one direction, or biaxially, by stretching the film in each of two mutually perpendicular directions in the plane of the film. Where the film is biaxially oriented, this orientation may be balanced or unbalanced, for example with the higher degree of orientation of an unbalanced film in a preferred direction—usually the transverse direction. Conveniently, the substrate film (which may be a single or multi-layer film) is (co)extruded in the form of a tube. This tube is subsequently quenched, reheated, then expanded by internal gas pressure to induce transverse orientation and finally drawn at a rate greater than that at which it was extruded to stretch and orient it in the longitudinal direction. Alternatively, a flat film may be oriented by simultaneous or sequential stretching in each of two mutually perpendicular directions by means of a stenter, or by a combination of draw rolls and a stenter.

The degree to which the film substrate is stretched depends to some extent on the ultimate use for which the film is intended, but for a polypropylene-based packaging film satisfactory tensile and other is properties are generally developed when the film is stretched to between three and ten, preferably, seven, times its original dimensions in each of the transverse and longitudinal directions.

After stretching the polymeric film substrate is normally "heat-set", while restrained against shrinkage or even maintained at constant dimensions, at a temperature above the glass transition temperature of the polymer and below its melting point. The optimum heat-setting temperature can readily be established by simple experimentation, and for a substrate film having a propylene polymer layer (whether on its own or as part of a multi-layer structure), "heat-setting" is conveniently effected at temperatures in the range of from 100° C. to 180° C. Heat-setting may be effected by conventional techniques, for example, by means of a stenter system, or by a system of one or more heated rollers as disclosed, for example, in GB-A-1124888. Alternatively, or additionally, the film may be subjected to a constrained heat treatment of the kind described in EP-A-23778.

Application of the heat sealable layer to the substrate film, optionally oriented and heat-set as hereinbefore described, may be effected by conventional coating techniques from a solution or dispersion of the polymer composition in a suitable solvent or dispersant. An aqueous coating composition, prepared by dissolving or dispersing the polymeric constituents of the heat sealable layer in an aqueous medium is a preferred coating composition from which to apply the heat sealable layer. When the second polymer of the heat sealable layer is a copolymer comprising monomer residues derived from an olefin and an olefinically unsaturated carboxylic acid as is preferred, dissolution of the copolymer in an aqueous medium is conveniently achieved by reacting it with an ammonium salt to neutralise at least some of the carboxylic acid groups and provide ammonium carboxylate functionality in the polymer. When the copolymer is dried, ammonia is given off and the ammonium carboxylate groups are converted to free carboxyl groups.

Application of the coating composition to the optionally treated surface of the substrate film may be achieved using any known coating technique, such as by gravure coating, roll eming, dipping, spraying, etc. The excess aqueous solution can be removed by squeeze rolls or doctor knives for example. The coating composition will ordinarily be applied in such an amount that there will be deposited, following drying, a smooth, evenly distributed heat sealable layer having a thickness in the range of from 20 to 100 μm, preferably in the range of from 40 to 80 μm.

Once the coating has been applied to the substrate film, it is subsequently dried preferably using hot air or radiant heat or by any other suitable heating means to provide the final heat sealable layer.

Adhesion of the heat sealable layer to the film substrate may be improved, if desired, by providing on the substrate a layer of an appropriate priming medium before deposition thereon of the heat sealable layer. Suitable primers are well known in the art and include, for example, acrylic primers, titanates, polyurethanes and poly(ethylene imines). A particularly suitable primer is an aqueous polyurethane solution containing about 4 to 5 weight % of the polyurethane.

If desired, the surface of a substrate film for use in accordance with the invention may be subjected to a chemical or physical surface-modifying treatment in order to improve adhesion. A preferred treatment, because of its simplicity and effectiveness, is to subject the film surface to a high voltage electrical stress accompanied by corona discharge. After treatment of the substrate film surface, it then can be coated with the coating composition containing the components of the heat sealable layer or with a suitable primer.

If desired, the second surface of the substrate film, i.e. the surface opposed to that on which the heat sealable layer is applied, may be coated with a print receptive polymer composition and, in particular, a print receptive acrylic polymer composition. Such compositions are known in the art. A preferred print receptive acrylic polymer is one comprising a copolymer of 2 to 15 weight % acrylic or methacrylic acid, 10 to 80 weight % methyl or ethyl acrylate and 10 to 80 weight % methylmethacrylate, all percentages being based on the total weight of the copolymer.

Composite multi-layer films in accordance with the invention may be prepared in a range of thicknesses governed primarily by the ultimate application for which a particular film is to be employed. Films, having a total thickness in a range extending from 2.5 to 100 μm are of general utility, but for packaging applications we prefer to employ a film of from about 10 to 50 μm, in total thickness.

One or more of the layers forming the multi-layer film of the invention may contain any of the additives conventionally employed in the manufacture of thermoplastic films. Thus, additives such as dyes, pigments, lubricants, anti-static agents, anti-oxidants, surface-active agents, stiffening aids, slip aids, gloss improvers, prodegradants and ultraviolet light stabilisers may be employed.

EXAMPLES

FIG. 1 is a schematic sectional view (not to scale) of a preferred multilayer film of the invention.

In FIG. 1, the multi-layer film comprises a substrate layer (1, 2a, 2b), two primer layers (3a, 3b), a heat sealable layer (4) and a print receptive layer (5). The substrate layer is a three layer, oriented polymer film having a core layer (1), preferably comprising an isotactic polypropylene homopolymer, and two outer layers (2a, 2b), which preferably comprise a linear low density ethylene polymer. The first surface of the substrate layer has been coated with a primer layer (3a) and the heat sealable layer (4) has been deposited over this primer layer. The second surface of the substrate layer has also been provided with a primer layer (3b) and the print receptive layer (5) has been deposited over this primer layer.

The present invention is now illustrated but not limited with reference to the following examples.

The following test methods were employed to assess the multi-layer films of the invention.

Heat Seal Threshold

To assess Heat Seal Threshold (HST), the minimum jaw temperature needed to obtain a seal failure strength of 200 g per 25 mm of seal was determined as follows. A series of tests were conducted each of which involved placing together two samples of the multi-layer film of the invention with the heat sealable surfaces in contact with each other. Each pair of film samples were then sealed together using a RDM Heat Sealer which was operated at a jaw pressure of 100 kN/m$^2$, a jaw closure time of 2 seconds and at progressively increasing temperatures for each test starting at 60° C. The HST was determined by inspection from a plot of measured seal strength against jaw temperature for the series of test samples.

Blocking

The heat sealable surface of a 115 cm$^2$ sample of film of the invention was placed in contact with a 115 cm$^2$ sample of polypropylene film coated with a conventional print receptive acrylic polymer layer and the two films were then held between mild steel plates under a load of 4 Kg for 2 hours at 60° C. After cooling to ambient temperature, a 25 mm wide strip is cut from the blocked adjacent film samples and the force s required to separate the samples was measured by means of a Blocking Balance and expressed in units of g/25 mm.

Hot Tack Performance

A series of tests were conducted in which two samples of the multi-layer film of the invention were placed together with the heat sealable surfaces in contact with each other. The ends of these film samples were then sealed together using a heat sealer which was operated at a jaw pressure of 100 kN/m$^2$, a jaw closure time of 2 seconds and at progressively increasing temperatures for each test (starting at 60° C.) to produce a 25 mm×25 mm seal. As soon as the sealing jaws were released, the seal was subjected to a 90 g spring load and the amount the seal opened as a result of this load was observed at each jaw temperature. The temperature range over which the seal opened less than 30% was then determined.

Example 1

A three layer, molecularly oriented and heat set substrate film comprising a core layer containing about 95 weight % of an isotactic polypropylene homopolymer and about 5 weight % of a polydicyclopentadiene resin and two outer layers of a linear low density polyethylene was prepared.

From a triple channel annular die were coextruded the polypropylene and polyethylene polymer compositions described above to form a tube which comprised a central annulus of the polypropylene polymer composition and an inner and outer annulus of the linear low density polyethylene.

The tube was cooled, heated to stretching temperature, expanded by internal gas pressure and withdrawn from the expansion zone at a rate greater than that at which it was fed thereto so that the tube was stretched to seven times its original dimensions in both the direction of extrusion and in a direction transverse thereto.

The stretched tubular film was then opened out to form a flat film which was heat set at a temperature of 120° C. using a system of heated rollers.

The heat set film was then treated by corona discharge using a single aluminium rod electrode extending across the entire width of the film which was connected to a Sherman GT60, 6 KW, solid state corona treater operating at 2 amps.

The thickness of the linear low density polyethylene layer on each surface of the resulting substrate film was about 0.45 $\mu$m and the total thickness of the film was about 24.5 $\mu$m. Each surface of the substrate film was then coated with a layer of a polyurethane primer to approximately 0.15 $\mu$m thickness. This layer was applied from an aqueous coating composition containing about 7.5 weight % of the polyurethane using a reverse gravure having 100 lines/25 mm at a line speed of 10 meters/minute and a gravure cylinder speed of 5 meters/minute. After coating, the primer layers were dried in an air oven to give a dry coat weight of about 1 g/m².

To one surface of the primed substrate film was applied a heat sealable layer of about 1 $\mu$m thickness. This layer comprised the following components in the following amounts:
- (i) 24 weight % of an amorphous acrylic polymer having a Tg of 61° C. and a weight average molecular weight (Mw) in the range 35,000 to 40,000 (Neocryl BT36 available from Zeneca Resins BV).
- (ii) 72 weight % of an ethylene acrylic acid copolymer having a Tg of −22° C., a Tm of 78° C. and comprising 85 weight % of ethylene monomer residues and 15 weight % of acrylic acid monomer residues (Morton™ 37F1 available from Morton International BV).
- (iii) 3.2 weight % of Clariant KPS microcrystalline wax and 0.6 weight % of Clariant 2106 emulsifier available from Clariant Specialties Ltd.
- (iv) 0.2 weight % of silica anti-block having a mean particle size of 3 $\mu$m.

The heat sealable layer was applied from an aqueous coating composition comprising 16 weight % total solids using a reverse gravure having 100 lines/25 mm at a line speed of 10 meters/minute and a gravure cylinder speed of 5 meters/minute. The preparation of the coating composition involved dissolving/dispersing the polymers in water with the aid of an ammonium salt which neutralised at least some of the carboxylic acid groups and provided ammonium carboxylate functionality in the polymers.

The microcrystalline wax and emulsifier were melted together and the resulting mixed melt added to boiling water. After cooling this mixture, a wax emulsion having a mean wax particle size of around 0.3 $\mu$m was formed and this was then added to the aqueous polymer composition. An aqueous silica dispersion (FP44; available from Formulated Polymer Products Limited) was then finally added to the aqueous polymer/wax composition to yield the coating composition.

After coating, the heat sealable layer was dried in an air oven to give a dry coat weight of 1 g/m2. Drying also resulted in the release of ammonia converting the ammonium carboxylate groups back to free carboxyl groups.

The Heat Seal Threshold, Blocking Performance and Hot Tack Performance of the resulting film were determined using the techniques described above, and the following results were obtained.

Heat Seal Threshold = 76° C.
Blocking Performance          75 g/25 mm
Hot Tack Performance          Less than 30% opening at 60 to 100° C.

Example 2

A three layer, molecularly oriented and heat set substrate film was prepared as described in Example 1.

Each surface of the substrate film was then coated with a layer of a polyurethane primer to approximately 0.15 $\mu$m thickness using the method described in Example 1.

To one surface of the primed substrate, film was applied a heat sealable layer of about 1 gm thickness. This layer comprised the following components in the following amounts:
- (i) 48 weight % of the amorphous acrylic polymer (Neocryl BT36) used in example 1.
- (ii) 48 weight % of the ethylene/acrylic acid copolymer (Morton™ 37F1) used in Example 1.
- (iii) 3.2 weight % of Clariant KPS microcrystalline wax and 0.6 weight % of Clariant 2106 emulsifier available from Clariant Specialties Ltd.
- (iv) 0.2 weight % of silica anti-block having a mean particle size of 3 $\mu$m.

This heat sealable layer was applied from an aqueous coating composition comprising 16 weight % total solids which was prepared as described in Example 1. Exactly the same coating technique as described in Example 1 was also used to apply the layer.

The Heat Seal Threshold, Blocking Performance and Hot Tack Performance of the resulting film were determined using the techniques described above, and the following results were obtained.

Heat Seal Threshold=89° C.

Blocking Performance=59 g/25 $\mu$m

Hot Tack Performance=Less than 30% opening at 75 to 95° C.

Example 3 (Comparative)

A three layer, molecularly oriented and heat set substrate film was prepared as described in Example 1. Each surface of the substrate film was then coated with a layer of a is polyurethane primer to approximately 0.15 $\mu$m thickness using the method described in Example 1.

To one surface of the primed substrate film was applied a heat sealable layer of about 1 $\mu$m thickness. This layer comprised the following components in the following amounts:
- (i) 72 weight % of the amorphous acrylic polymer in Example 1.
- (ii) 24 weight % of the ethyleneacrylic acid copolymer (Morton™ 37F1) used in Example 1.
- (iii) 3.2 weight % of Clariant KPS microcrystalline wax and 0.6 weight % of Clariant 2106 emulsifier available from Clariant Specialties Ltd.
- (iv) 0.2 weight % of silica anti-block having a mean particle size of 3 $\mu$m.

This heat sealable layer was applied from an aqueous coating composition comprising 16 weight % total solids which was prepared as described in Example 1. Exactly the same coating technique as described in Example 1 was also used to apply the layer. The Heat Seal Threshold, Blocking Performance and Hot Tack Performance of the resulting film were determined using the techniques described above, and the following results were obtained.

Heat Seal Threshold=102° C.
Blocking Performance=166 g/25 mm
Hot Tack Performance=no closure

What is claimed is:

1. A multi-layer film comprising:
   (a) a substrate layer of a thermoplastic polymer film having opposed first and second surfaces; and
   (b) a heat sealable layer associated with the first surface of the substrate, the heat sealable layer comprising:
      (i) from 5 to 60% by weight of a first polymer, which is an amorphous acrylic polymer having a glass transition temperature in the range of from 40 to 120° C. and a weight average molecular weight in the range of from 20,000 to 60,000; and
      (ii) from 40 to 95% by weight of a second polymer, which is a copolymer of a $C_2$–$C_4$ olefinically unsaturated hydrocarbon and an olefinically unsaturated carboxylic acid.

2. A multi-layer film as claimed in claim 1, wherein the heat sealable layer has a heat sealing temperature in the range of from 50 to 90° C.

3. A multi-layer film according to claim 2, wherein the first acrylic polymer has a glass transition temperature in the range from 50° C. to 100° C.

4. A multi-layer film as claimed in claim 2, wherein the second polymer of the heat sealable layer has a number average molecular weight (Mn) in the range of from 2,000 to 100,000.

5. A multi-layer film as claimed in claim 2, wherein the second polymer of the heat sealable layer has a glass transition temperature (Tg) in the range of from 0 to −60° C. and a crystalline melting point (Tm) in the range of from 60 to 100° C.

6. A multi-layer film as claimed in claim 2 wherein the heat sealable layer additionally comprises a slip agent.

7. A multi-layer film as claimed in claim 2, wherein the heat sealable layer additionally comprises an inert particulate additive.

8. A multi-layer film according to claim 1, wherein the first acrylic polymer has a glass transition temperature in the range from 50° C. to 100° C.

9. A multi-layer film as claimed in claim 8, wherein the second polymer of the heat sealable layer has a number average molecular weight (Mn) in the range of from 2,000 to 100,000.

10. A multi-layer film as claimed in claim 8, wherein the second polymer of the heat sealable layer has a glass transition temperature (Tg) in the range of from 0 to −60° C. and a crystalline melting point (Tm) in the range of from 60 to 100° C.

11. A multi-layer film as claimed in claim 8, wherein the heat sealable layer additionally comprises a slip agent.

12. A multi-layer film as claimed in claim 8, wherein the heat sealable layer additionally comprises an inert particulate additive.

13. A multi-layer film as claimed in claim 1, wherein the first acrylic polymer is a copolymer of a $C_{1-4}$ allyl methacrylate, a $C_{1-4}$ alkyl acrylate and acrylic and/or methacrylic acid.

14. A multi-layer film as claimed in claim 13, wherein the second polymer of the heat sealable layer has a number average molecular weight (Mn) in the range of from 2,000 to 100,000.

15. A multi-layer film as claimed in claim 13, wherein the second polymer of the heat sealable layer has a glass transition temperature (Tg) in the range of from 0 to −60° C. and a crystalline melting point (Tm) in the range of from 60 to 100° C.

16. A multi-layer film as claimed in claim 13, wherein the heat sealable layer additionally comprises a slip agent.

17. A multi-layer film as claimed in claim 13, wherein the heat sealable layer additionally comprises an inert particulate additive.

18. A multi-layer film as claimed in claim 1, wherein the second polymer of the heat sealable layer has a number average molecular weight (Mn) in the range of from 2,000 to 100,000.

19. A multi-layer film as claimed in claim 18, wherein the second polymer of the heat sealable layer has a glass transition temperature (Tg) in the range of from 0 to −60° C. and a crystalline melting point (Tm) in the range of from 60 to 100° C.

20. A multi-layer film as claimed in claim 18, wherein the heat sealable layer additionally comprises a slip agent.

21. A multi-layer film as claimed in claim 18, wherein the heat sealable layer additionally comprises an inert particulate additive.

22. A multi-layer film as claimed in claim 1, wherein the second polymer of the heat sealable layer has a glass transition temperature (Tg) in the range of from 0 to −60° C. and a crystalline melting point (Tm) in the range of from 60 to 100° C.

23. A multi-layer film as claimed in claim 22, wherein the heat sealable layer additionally comprises a slip agent.

24. A multi-layer film as claimed in claim 22, wherein the heat sealable layer additionally comprises an inert particulate additive.

25. A multi-layer film as claimed in claim 1, wherein the second polymer comprises 60 to 95 weight % of monomer residues derived from the $C_{2-4}$ olefinically unsaturated hydrocarbon and from 5 to 40 weight % of monomer residues derived from the olefinically unsaturated carboxylic acid.

26. A multi-layer film as claimed in claim 25, wherein the heat sealable layer additionally comprises a slip agent.

27. A multi-layer film as claimed in claim 25, wherein the heat sealable layer additionally comprises an inert particulate additive.

28. A multi-layer film as claimed in claim 1, wherein the second polymer is a copolymer of ethylene and acrylic acid.

29. A multi-layer film as claimed in claim 28, wherein the heat sealable layer additionally comprises a slip agent.

30. A multi-layer film as claimed in claim 28, wherein the heat sealable layer additionally comprises an inert particulate additive.

31. A multi-layer film as claimed in claim 1, wherein the heat sealable layer additionally comprises a slip agent.

32. A multi-layer film as claimed in claim 31, wherein the heat sealable layer additionally comprises an inert particulate additive.

33. A multi-layer film as claimed in claim 1, wherein the heat sealable layer additionally comprises an inert particulate additive.

* * * * *